United States Patent
Kimura et al.

(12) 
(10) Patent No.: US 6,352,656 B1
(45) Date of Patent: Mar. 5, 2002

(54) MANUFACTURING METHOD FOR METALLIC STAMPER AND METALLIC STAMPER AND, MANUFACTURING METHOD FOR OPTICAL DISK SUBSTRATE WITH THE USE OF THE STAMPER AND OPTICAL DISK FABRICATED BY THE MANUFACTURING METHOD

(75) Inventors: Tadashi Kimura, Kobe; Fumiaki Ueno, Kyoto, both of (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/311,638

(22) Filed: May 14, 1999

(30) Foreign Application Priority Data

May 14, 1998 (JP) .............................. 10-130919

(51) Int. Cl.[7] .................. B29D 11/00; G11B 7/26; B29C 33/38
(52) U.S. Cl. .................. 264/2.5; 216/24; 264/1.33; 425/175; 425/810; 428/64.4
(58) Field of Search ................. 264/1.1, 1.33, 264/2.5; 425/175, 810; 369/272; 428/913, 64.2, 64.4; 205/271; 216/24

(56) References Cited

FOREIGN PATENT DOCUMENTS

| EP | 488 239 | * | 6/1992 |
| JP | 58-114341 | * | 7/1983 |
| JP | 63-181139 | * | 7/1988 |
| JP | 4-40642 | * | 2/1992 |

OTHER PUBLICATIONS

Morita et al., "Super–High Density Optical Disk Using Deep Groove Method", Material by the Electricity Studies Magnetics Meeting, pp. 29–37, Nov. 29, 1996.

* cited by examiner

*Primary Examiner*—Mathieu D. Vargot
(74) *Attorney, Agent, or Firm*—Wenderoth, Lind & Ponack, L.L.P.

(57) ABSTRACT

The present invention provides a method for manufacturing optical disk substrates whereby grooves and pits of optical disk substrates are formed highly accurately and finely, so that resulting optical disks can be of large-capacity and reduced in noise level. A coat of an organic material is provided on a substrate which is to be a master, on which a mask material is patterned as an etching mask. After the coat of the organic material is etched, the mask material is removed, whereby a master is obtained. A metallic coat is formed to the master. A metallic main body portion is integrally formed on the metallic coat. A metallic portion comprising the metallic coat and metallic main body portion is separated from the master. A metallic stamper is thus formed.

9 Claims, 4 Drawing Sheets

MANUFACTURING METHOD FOR METALLIC STAMPER AND METALLIC STAMPER AND, MANUFACTURING METHOD FOR OPTICAL DISK SUBSTRATE WITH THE USE OF THE STAMPER AND OPTICAL DISK FABRICATED BY THE MANUFACTURING METHOD

BACKGROUND OF THE INVENTION

The present invention relates to a method for manufacturing a metallic stamper and a metallic stamper fabricated by the manufacturing method and, a method for manufacturing substrates of optical disks with the use of the stamper and optical disks fabricated by the manufacturing method. The substrates of the optical disks are used for CDs (Compact Disks), DVD(Digital Versatile Disk)-ROMs, DVD-RAMS, etc.

A conventional method for producing optical disk substrates will be described.

One example of the conventional manufacturing methods for the optical disk is disclosed in the "Material by the Electricity Studies Magnetics Meeting (on pages 29–37, 1996)", which is a manufacturing method for high-recording-density optical disks based on a Deep Groove method. A manufacturing method with using dry etching for a master is reported in the Material.

FIGS. 4A–4F show a conventional art of production procedures for the master by dry etching. In FIGS. 4A–4F, 31a is a quartz substrate to be a master and 32 is a pattern of resist as an etching mask formed by exposure and development by a laser cutting machine. 31b is the quartz substrate from which the resist is removed after dry etching. 34 is a stamper made of Ni comprising an Ni coat 34a formed by sputtering and an Ni main body portion 34b formed by electroforming, so called a plating. 35 is an optical disk substrate molded of polycarbonate.

Hereinbelow is discussed the production process of the master with using dry etching in the manufacturing method for the optical disk substrates.

In the first place, a resist is provided in a thickness of 140 nm on the quartz substrate 31a by a rotational application method, so called spin coating. The resist is exposed by the laser cutting machine to form a pattern of grooves and a pattern of pits, and developed, whereby the pattern of resist 32 as shown in FIG. 4A is obtained. The quartz substrate is then etched to a depth of 70 nm by dry etching with the use of a gas including oxygen and fluorine (e.g., mixed gas of $CHF_3$ and $O_2$) while the pattern of resist 32 is used as an etching mask. The resist of the pattern is removed thereafter, whereby the quartz substrate 31b having depressions and projections on a surface thereof as indicated in FIG. 4B is obtained. The depressions formed on the surface of the quartz substrate 31b form the grooves and pits on the optical disk substrate 35. After the quartz substrate 31b is cleaned, the Ni coat 34a of a thickness of 50 nm is formed on a whole area of the quartz substrate 31b by sputtering. In FIG. 4C, a whole area of the Ni coat 34a is subjected to 0.4 mm-thick Ni plating by electroforming, thereby forming the Ni main body portion 34b. The Ni stamper 34 of FIG. 4D is obtained by removing the quartz substrate 31b. With using the Ni stamper 34 as a mold, the optical disk substrate 35 of polycarbonate is molded as shown in FIGS. 4E and 4F. A recording film and a protecting film are formed on the substrate 35, and then an optical disk is completed by bonding each protecting film of two substrates 35 with an adhesive.

In the conventional method as described hereinabove, when the Ni stamper 34 is separated from the quartz substrate 31b having the grooves and pits formed by the dry etching, the quartz substrate 31b and Ni stamper 34 are subjected to friction at depressions 36 and projections 37 because of a difference of thermal expansion coefficients of the quartz substrate 31b and Ni stamper 34 and also an internal stress of the Ni coat 34a, which leads to protuberances 38 at a surface of the stamper 34 due to a difference of hardnesses of quartz and Ni as is clear from FIG. 4D. The shape of the surface of the stamper 34 is eventually transferred to the optical disk substrate 35, forming recesses 39 which invite noises on the occasion of recording and reproduction. Further, when the quartz substrate is processed by dry etching to form the projections 37 and the depressions 36 forming the grooves and pits, since each depth of the grooves and pits, that is, each depth of the depressions 36 is controlled by a time of the dry etching, high depth accuracy cannot be expected and uniformity on the etched plane and reproducibility of the etching are rendered instable, resulting in irregular noise characteristic.

In a different method for manufacturing the optical disks employed heretofore, the Ni stamper is directly formed on the resist pattern on the quartz substrate. However, it is difficult to form the resist pattern in a rectangular shape to conform to a fine pattern of the resist to attain high-density recording, and at the same time a surface of the patterned resist coat is not smooth, but rough. Thus, the noise characteristic becomes disadvantageously poor in this method as well.

SUMMARY OF THE INVENTION

The object of the present invention is therefore to provide a manufacturing method for a metallic stamper and a metallic stamper, and a manufacturing method for optical disk substrates with the use of the metallic stamper and optical disks produced by the manufacturing method, which can finely form grooves, or grooves and pits of optical disk substrates with high density, thereby realizing large-capacity optical disks and reducing a noise level. A further object of the present invention is to enhance depth accuracy in forming the grooves, or the grooves and pits with good reproducibility.

In order to accomplish the above-described objects, according to a first aspect of the present invention, there is provided a manufacturing method for a metallic stamper, which comprises:

forming a coat made of a low-hardness material onto a substrate which is to be a master, the low-hardness material having a lower hardness than metal of projections at a metallic stamper to prevent deformation of the projections on the occasion of separating a metallic portion from the master;

forming a pattern of a mask to be an etching mask onto the low-hardness material;

etching a non-masked portion not masked by the mask of the low-hardness material at least partially in a thicknesswise direction of the substrate;

after the etching, removing the mask, thereby obtaining the master;

forming the metallic portion onto the master; and separating the metallic portion from the master, thereby obtaining the metallic stamper.

Further, the non-masked portion may be totally removed in the thicknesswise direction of the substrate so as to expose a smooth surface of the substrate, so that the smooth surface constitutes smooth top faces of the projections.

Further, a thickness of the low-hardness material formed on the substrate of the master may correspond to a depth of grooves or pits of an optical disk substrate produced with the use of the metallic stamper.

According to the first aspect of the present invention, the low-hardness material is lower in hardness than a metal forming projections of the metallic stamper, and therefore the metallic stamper is prevented from being flawed and finned when separated from the master. Thus, grooves, or grooves and pits can be formed finely with high accuracy in the optical disk substrates. When the low-hardness material is provided to be even with the grooves, or the grooves and pits of the optical disk substrate, the low-hardness material can be almost selectively etched by selecting the low-hardness material or etching-gas or etching method without etching the substrate, so that the uniformity in the depth of the grooves, or the grooves and pits at a whole area of bottom surfaces of the grooves and pits and reproducibility in forming the grooves, or the grooves and pits are enhanced. Depth accuracy of the grooves, or the grooves and pits is increased, and optical disk substrates can be manufactured with good reproducibility.

Further, according to the second aspect of the present invention, there is provided a metallic stamper which is formed with the use of the manufacturing method of the first aspect of the present invention.

Further, according to the third aspect of the present invention, there is provided a manufacturing method for optical disk substrates, comprising molding a resin with the use of the metallic stamper of the second aspect of the present invention to form an optical disk substrate.

Further, according to the fourth aspect of the present invention, there is provided an optical disk manufactured by molding resin with the use of the manufacturing method for optical disk substrates of the third aspect of the present invention.

BRIEF DESCRIPTION OF THE DRAWINGS

These and other objects and features of the present invention will become clear from the following description taken in conjunction with the preferred embodiments thereof with reference to the accompanying drawings throughout which like portions are designated by like reference numerals, and in which.

DETAILED DESCRIPTION OF THE PREFERRED EMBODIMENTS

Figure 1A:
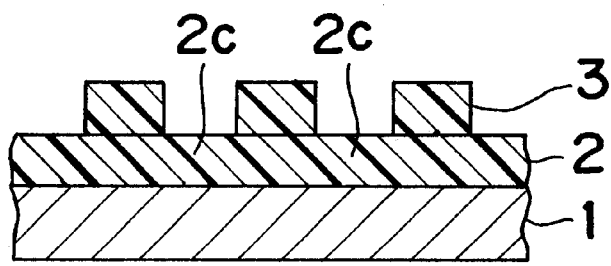
FIGS. 1A, 1B, 1C, 1D, 1E, and 1F are diagrams of a production process for an optical disk substrate according to an embodiment 1 of the present invention.

Before the description of the present invention proceeds, it is to be noted that like portions are designated by like reference numerals throughout the accompanying drawings.

A manufacturing method for a metallic stamper and a metallic stamper formed by the manufacturing method, and a manufacturing method for optical disk substrates with the use of the metallic stamper and optical disks produced by the manufacturing method according to preferred embodiments of the present invention will be discussed below.

Embodiment 1

In FIGS. 1A–1F, reference numerals respectively represent: 1 an Si substrate which is a base of a master for a metallic stamper 4; 2 an acrylic coat of an organic material corresponding to a low-hardness material and formed in a thickness of 100 nm by a rotational application method, so called a spin coating; 2a the acrylic coat after undergoing dry etching; 3 a resist material forming a pattern of mask as an etching mask through exposure and development by a laser cutting machine; 4 a metallic stamper comprising an Ni coat 4a corresponding to a metallic coat formed by sputtering and an Ni main body portion 4b corresponding to a metallic main body portion formed by plating, i.e., electroforming; and 5 an optical disk substrate molded of polycarbonate.

Production procedures in the manufacturing method of the optical disk substrate constituted as above will be detailed with reference to FIGS. 1A–1F.

Figure 1B:
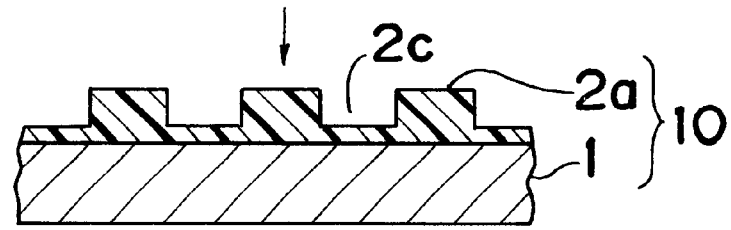
Figure 1C:
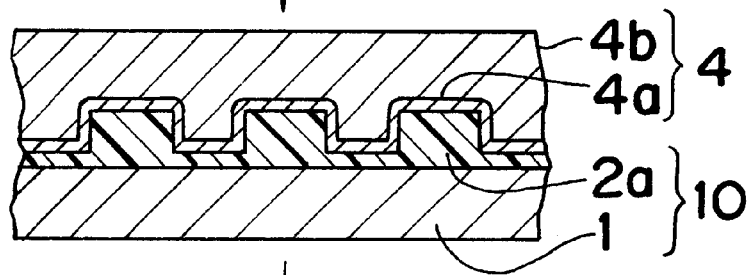
Figure 1D:
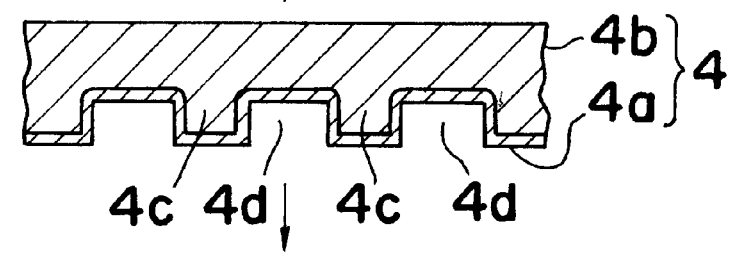
Figure 1E:
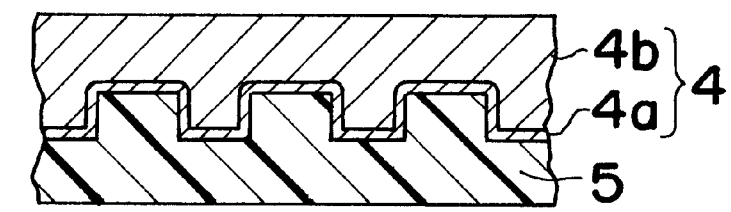
Figure 1F:
Figure 3:
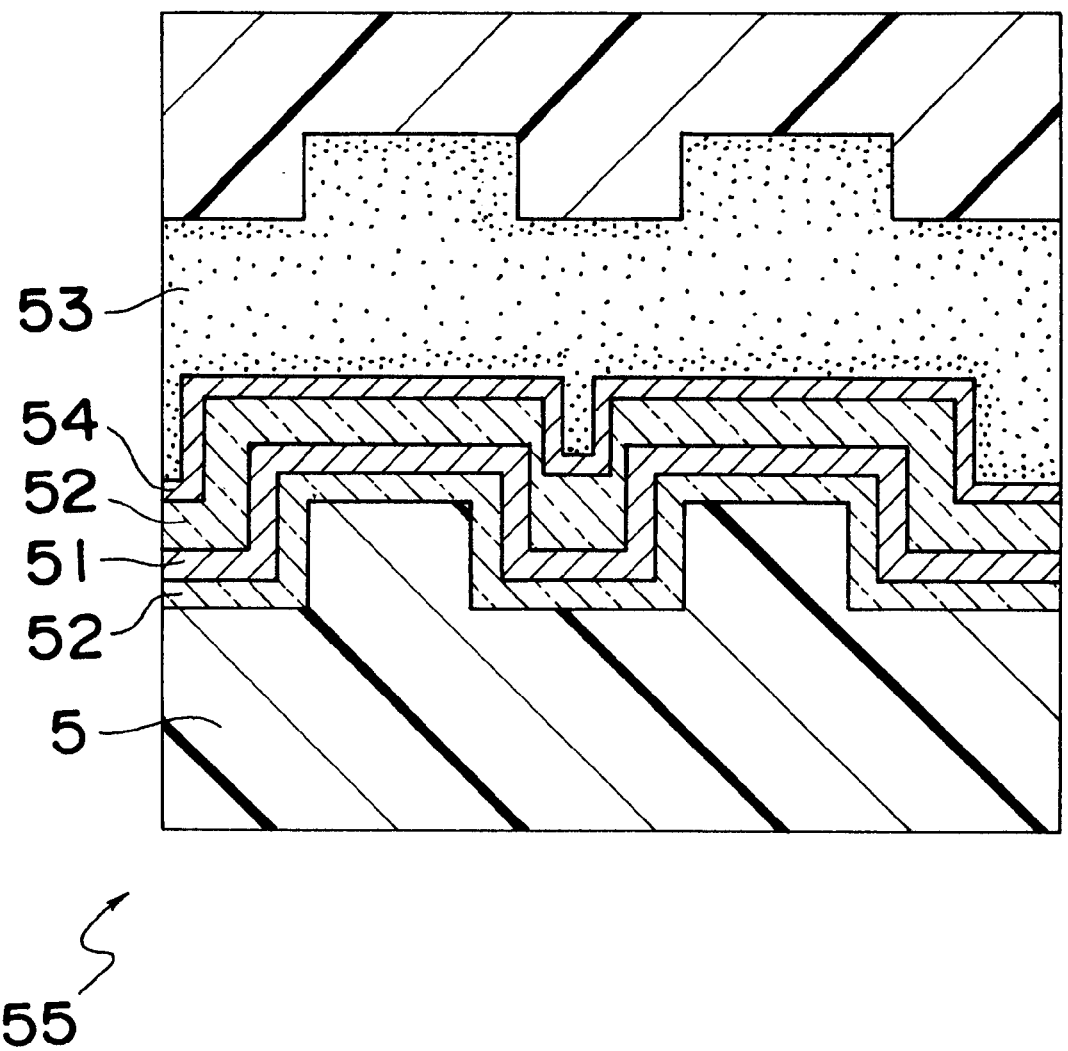
FIG. 3 is a sectional view of an optical disk.
Figure 4A:
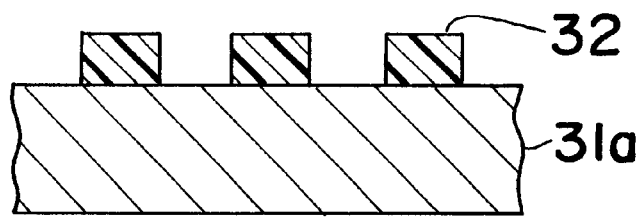
FIGS. 4A, 4B, 4C, 4D, 4E, and 4F are diagrams of a production process for an optical disk substrate in a conventional example.
Figure 4B:
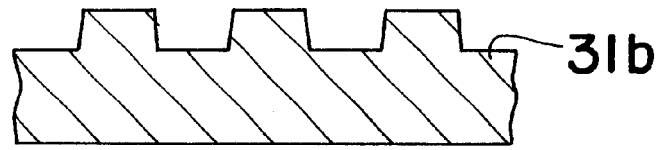
Figure 4C:
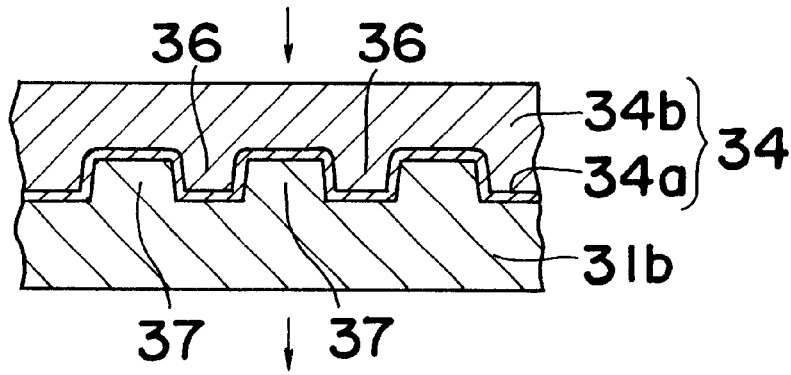
Figure 4D:
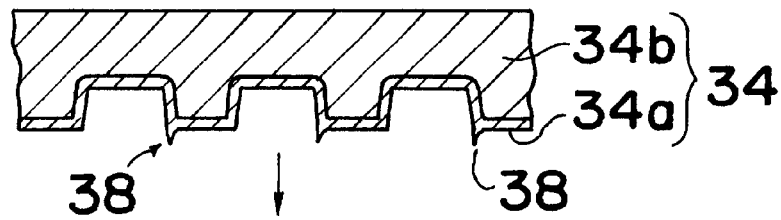
Figure 4E:
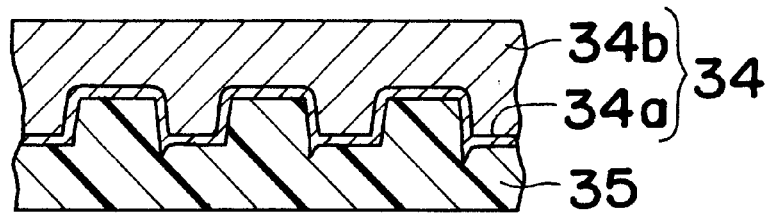
Figure 4F:
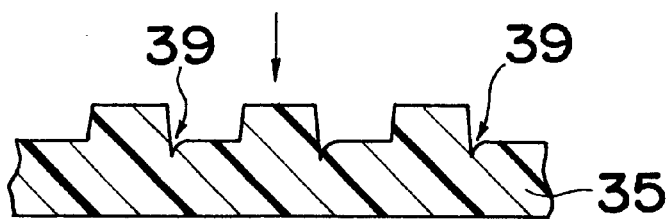

After a resin material essentially consisting of acryl is dropped on the Si substrate 1 which is rotating to apply the acrylic resin material all over a surface of the Si substrate 1 by a centrifugal force, which is a rotational application method. The acrylic resin material is baked in a heat treatment with using an oven or a hot plate. The acrylic coat 2 of 100 nm thickness is consequently formed on the Si substrate 1. The acrylic coat 2 may be formed in any way, not limited to the above rotational application method, so long as the coat is obtained in a uniform coat thickness. Thereafter, a photoresist film of the resist material is formed on the acrylic coat 2 by the rotational application method, exposed by a laser cutting machine to form grooves pattern, or grooves pattern and pits pattern, and developed, whereby a resist pattern 3 of the resist material as shown in FIG. 1A is obtained. As disclosed, e.g., in Japanese Patent No. 2623672, with using the resist pattern 3 as an etching mask, a non-masked portion 2c not masked by the resist pattern 3 among the acrylic coat 2 is etched by dry etching to a depth of 70 nm with the use of a gas including oxygen and fluorine, for instance, mixed gas of $O_2$ and $CHF_3$. The resist material is removed by a methyl isobutyl ketone solution and the acrylic coat 2 is cleaned by isopropyl alcohol. In consequence, the acrylic coat 2a having depressions and projections on a surface thereof as in FIG. 1B is formed. The thus-formed Si substrate 1 with the acrylic coat 2a thereon serves as a master 10. Then, the Ni coat 4a is formed by sputtering in a thickness of 50 nm on a whole area of the acrylic coat 2a formed on the Si substrate 1. And then Ni is plated onto a whole area of the Ni coat 4a in a thickness of 0.4 mm by electroforming, so that the Ni main body portion 4b is formed integrally with the Ni coat 4a as in FIG. 1C. In FIG. 1D, an Ni member as a metallic portion, that is, an integral part of the Ni coat 4a and Ni main body portion 4b is separated from the master 10 to obtain the Ni stamper 4. This Ni stamper 4 has projections 4c and depressions 4d formed corresponding to the depressions and projections of the acrylic coat 2a. The projections 4c form the grooves, or the grooves and pits and the depressions 4d form lands on the optical disk substrate 5. Although slightly, a portion of the acrylic coat 2 sometimes adheres to a surface of the Ni stamper 4 at this time, and therefore the surface of the Ni stamper 4 is cleaned by plasma ashing with the use of oxygen gas to remove the remaining acrylic coat. The Ni stamper 4 is used as a mold to mold the optical disk substrate 5 of polycarbonate, as shown in FIGS. 1E and 1F. As shown in FIG. 3, a recording film 51, protecting films 52, and a reflecting film 54 are formed on the substrate 5. An optical disk 55 shown in FIG. 3 as a final product is manufactured by bonding between the substrate 5 having the recording film 51 and an another substrate 5 without having the recording film 51 with an adhesive 53. In the optical disk 55 shown in FIG. 3, the another substrate 5 has no recording film 51. However the another substrate 5 may have the recording film 51, the protecting films 52, and the reflecting film 54.

According to the embodiment 1 described herein-above, the Ni stamper 4 is prevented from being flawed and accompanied with fins on the surface thereof when separated from the master 10, because the surface of the master 10 is formed of acryl which is lower in hardness than Ni of the Ni stamper 4. Thus, in the case where grooves, or grooves and pits of the optical disk substrates 5 are formed fine, optical disks can be increased in capacity and a noise level can be reduced.

Embodiment 2

An embodiment 2 of the present invention will be specifically discussed with reference to FIGS. 2A–2F.

In FIGS. 2A–2F, a difference from the above embodiment 1 is that an application thickness of the acrylic coat 2 is set to be equal to depth of the grooves, or the grooves and pits, with the other points kept unchanged.

Production procedures in the manufacturing method for optical disk substrates will be described with reference to FIGS. 2A–2F.

Figure 2A:
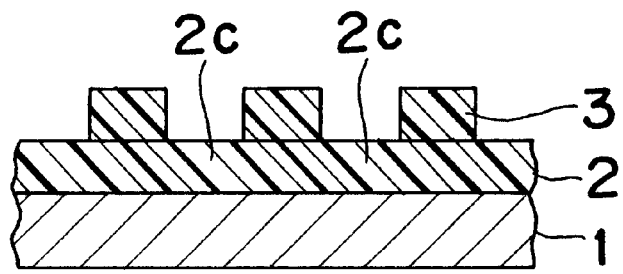
FIGS. 2A, 2B, 2C, 2D, 2E, and 2F are diagrams of a production process for an optical disk substrate according to an embodiment 2 of the present invention.
Figure 2B:
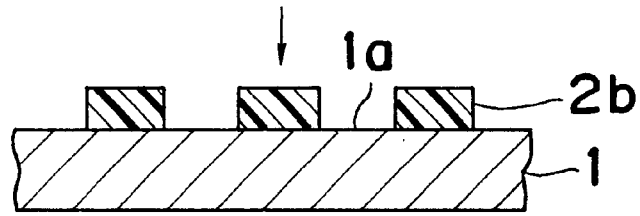
Figure 2C:
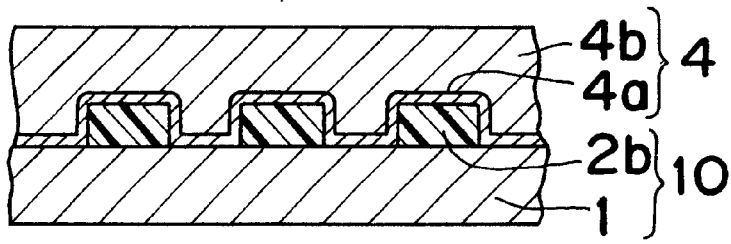

After applying the acryl onto the Si substrate 1 by the rotational application method, the acryl is baked, so that an acrylic coat 2 is formed on the Si substrate 1 in the same thickness of 70 nm as a design depth of grooves, or grooves and pits. The photoresist film of the resist material is formed on the acrylic coat 2 by the rotational application method, then exposed to form the groove pattern, or the grooves and pit pattern by the laser cutting machine, and developed. As a result, the resist pattern 3 of the resist material is obtained as in FIG. 2A. The non-masked portion 2c of the acrylic coat 2 is etched selectively to become approximately even with a smooth surface 1a of the Si substrate 1 as a base by dry etching with the use of an oxygen-based gas. At this time, the above resist pattern is used as an etching mask. The resist material 3 is removed thereafter by the methyl isobutyl ketone solution, and the acrylic coat 2 is cleaned by the isopropyl alcohol, whereby the pattern 2b of the acrylic coat 2 is obtained as shown in FIG. 2B. Succeeding steps in FIGS. 2C to 2F are carried out the same as corresponding steps of FIGS. 1C–1F of the embodiment 1. The oxygen-based gas is employed because a gas including fluorine atoms would etch Si of the substrate 1 thereby forming a pebbling on the smooth surface 1a. Consequently, the design depth of grooves, or grooves and pits is not satisfied.

Figure 2D:
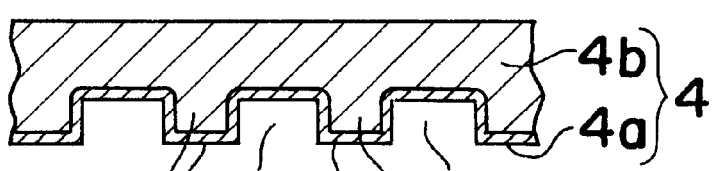
Figure 2E:
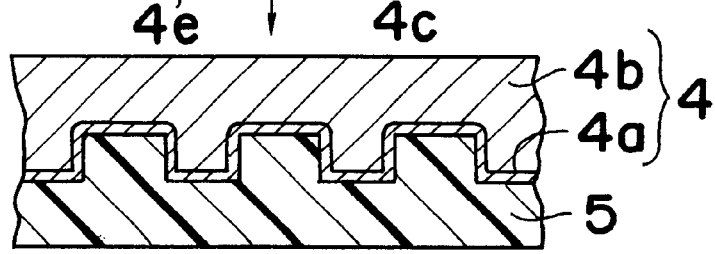
Figure 2F:
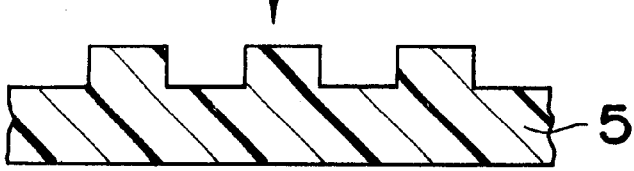

As described herein, according to the embodiment 2, since the surface of the master 10 is formed of acryl which is lower in hardness than Ni of the Ni stamper 4, the Ni stamper 4 is eliminated from flaws and protuberances when separated from the master 10. Thus, the grooves, or the grooves and pits of the optical disk substrate 5 are formed fine, so that resulting optical disks are of large-capacity and reduced in noise level. In addition, the oxygen-based gas not including fluorine gas enables selective etching only to the acrylic coat 2 without etching the Si substrate 1. A top face 4e of each projection 4c of the Ni stamper 4 is accordingly made smooth by the smooth surface 1a of the Si substrate 1 as shown in FIG. 2D. The selective etching also works to control the depth of the grooves, or the grooves and pits of the optical disk substrate 5 by the coat thickness of the applied acrylic coat without adverse influences of variations in uniformity and reproducibility of etching time and etching speed. So, depth accuracy in forming the grooves, or the grooves and pits is enhanced within a smooth accuracy of the surface 1a of the Si substrate 1 and good reproducibility is maintained.

In the foregoing embodiments, although the resin material essentially consisting of acryl is used as the organic coat, an organic resin such as polyimide resin or the like is similarly utilizable. However, the resin material is not limited to the above materials. Namely, the same effect is achieved by using a low-hardness material of a lower hardness than the metallic stamper, which is hard enough to endure the formation process of the metallic stamper and prevents the projections of the metallic stamper from being deformed when the metallic stamper is separated from the low-hardness material. On the other hand, although Ni is exemplified as the metal constituting the metallic stamper, the metal is not restricted to Ni, that is, metals and other materials hard enough to function as the stamper and prevent the deformation of projections when separated from the low-hardness material can be used.

A substrate of the master 10 is not limited to the Si substrate 1 as in the above embodiments. A quartz substrate, glass substrate or the like smooth surface substrate is allowed.

In the present invention as described above, the pattern with forms the depressions and projections to the metallic stamper and is made of the material of a lower hardness than the metallic portion of the metallic stamper is formed on the substrate of the master. Therefore, flaws and protuberances are not given rise to at the surface of the metallic stamper when the metallic stamper is separated from the master. Accordingly the optical disk substrates produced with the use of the metallic stamper include highly accurate and fine grooves, or grooves and pits, so that resulting optical disks enjoy a large capacity in reduced noise level. Further, depth accuracy in forming the grooves, or the grooves and pits is kept highly accurate within the smooth accuracy of the surface of the substrate of the master, and therefore the optical disk substrates can be manufactured with good reproducibility.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A manufacturing method for a metallic stamper, which comprises:

forming a coat made of a resin material consisting essentially of acryl or polyimide onto a Si substrate which is to be a master, the resin material having a lower hardness than Ni of projections at a metallic stamper of Ni to prevent deformation of the projections on the occasion of separating the stamper from the master;

forming a pattern of a mask to be an etching mask onto the resin material;

etching a non-masked portion not masked by the mask of the resin material partially in a thicknesswise direction of the Si substrate to retain part of the non-masked portion of the resin material;

after the etching, removing the mask, thereby obtaining the master;

forming an Ni portion onto the master; and separating the Ni portion from the resin material preventing deformation of the projections, thereby obtaining the metallic stamper.

2. A manufacturing method for a metallic stamper according to claim 1, wherein the non-masked portion is removed by dry etching with a gas including oxygen.

3. A manufacturing method for a metallic stamper according to claim 2, wherein the non-masked portion is removed by dry etching with the gas including oxygen to which a gas including fluorine atoms are added.

4. A manufacturing method for a metallic stamper according to claim 1, wherein the resin material consists essentially of polyimide.

5. A manufacturing method for a metallic stamper according claim 1, wherein the resin material consists essentially of acryl.

6. A manufacturing method for a metallic stamper according to claim 1, wherein the Ni portion of the metallic stamper is constituted by an Ni coat and an Ni main body portion, the Ni coat being made onto the pattern formed on the Si substrate of the master having the pattern by sputtering and then the Ni main body portion being formed on the Ni coat through Ni electroforming.

7. A metallic stamper which is formed with the use of the manufacturing method for the metallic stamper according to claim 1.

8. A manufacturing method for optical disk substrates, comprising molding a resin with the use of the metallic stamper according to claim 7 to form an optical disk substrate.

9. An optical disk which is resin-formed with the use of the manufacturing method for optical disk substrates according to claim 8.

* * * * *